US009706362B2

United States Patent
Hoseinitabatabaei et al.

(10) Patent No.: US 9,706,362 B2
(45) Date of Patent: Jul. 11, 2017

(54) INFORMATION DETERMINATION IN A PORTABLE ELECTRONIC DEVICE CARRIED BY A USER

(71) Applicant: University of Surrey, Surrey (GB)

(72) Inventors: Seyed Hoseinitabatabaei, Surrey (GB);
Alexander Gluhak, Surrey (GB);
Rahim Tafazolli, Sutton Surrey (GB)

(73) Assignee: University of Surrey, Surrey (GB)

( * ) Notice: Subject to any disclaimer, the term of this patent is extended or adjusted under 35 U.S.C. 154(b) by 51 days.

(21) Appl. No.: 14/389,746

(22) PCT Filed: Apr. 10, 2013

(86) PCT No.: PCT/EP2013/057505
§ 371 (c)(1),
(2) Date: Sep. 30, 2014

(87) PCT Pub. No.: WO2013/144380
PCT Pub. Date: Oct. 3, 2013

(65) Prior Publication Data
US 2015/0065164 A1     Mar. 5, 2015

(30) Foreign Application Priority Data

Mar. 30, 2012  (GB) .................................. 1205740.2

(51) Int. Cl.
*H04W 4/02* (2009.01)
*G01C 21/16* (2006.01)
*G01C 25/00* (2006.01)

(52) U.S. Cl.
CPC ............ *H04W 4/026* (2013.01); *G01C 21/16* (2013.01); *G01C 25/005* (2013.01)

(58) Field of Classification Search
CPC ...... H04W 4/026; G01C 21/16; G01C 25/005
See application file for complete search history.

(56) References Cited

U.S. PATENT DOCUMENTS

| | | | |
|---|---|---|---|
| 2011/0307213 A1 | 12/2011 | Zhao et al. | |
| 2012/0254809 A1* | 10/2012 | Yang | G06F 3/038 715/863 |

(Continued)

FOREIGN PATENT DOCUMENTS

WO     2013025507 A1     2/2013

OTHER PUBLICATIONS

International Search Report and Written Opinion for International Application No. PCT/EP2013/057505, International Filing Date Apr. 10, 2013, Report Completed Jul. 31, 2013, Mailed Jan. 3, 2014, 15 pgs.

(Continued)

*Primary Examiner* — Brandon Miller
(74) *Attorney, Agent, or Firm* — KPPB LLP

(57) ABSTRACT

A method of determining the location of a device on the body of a user carrying it, comprising determining a mathematical representation of a transformation between a device reference frame and an earth reference frame at the device; receiving information from a sensor arrangement of the device capable of measuring device movement while the user is walking, and transforming information from the sensor arrangement, using said mathematical representation, into the earth reference frame at the device; and performing statistical analysis on at least one component of the information from the sensor arrangement obtained in the transformation to identify one or more features corresponding to a specific location of the device. Also provided is a method of determining the orientation of a user's body relative to a reference frame, using a device carried by a user. The method comprising determining a location of a device on the body of a user carrying it, and selecting a method out of a plurality of methods for determining the orientation of the (Continued)

user relative to the reference frame based on the determined location of the device.

34 Claims, 5 Drawing Sheets

(56) References Cited

U.S. PATENT DOCUMENTS

2013/0046505 A1* 2/2013 Brunner .............. G01C 21/165
 702/141
2013/0084805 A1* 4/2013 Pasquero .............. G01C 17/32
 455/41.2

OTHER PUBLICATIONS

Blanke et al., "Sensing Location in the Pocket", Ubicomp Poster Session, Jan. 1, 2008, XP055073674, Retrieved from: http://ulfblanke.com/research/ubicomp08/paper.pdf, Retrieved on Jul. 31, 2013, 2 pgs.

Henpraserttae et al., "Accurate Activity Recognition Using a Mobil Phone Regardless of Device Orientation and Location" Body Sensor Networks (BSN), 2011 International Conference, IEEE, May 23, 2011, XP031896426, DOI:10.1109/BSN.2011.8, ISBN: 978-1-4577-0469-7, pp. 41-46.

Kunze et al., "Where am I: Recognizing On-body Positions of Wearable Sensors", Lecture Notes in Computer Science vol. 3479, Jan. 1, 2005, XP055041023, LoCA 2005, DOI: 10.1007/11426646_25, ISBN: 978-3-54-025896-4, Retrieved from: http://rd.springer.com/content/pdf/10.

Mizell, David, "Using Gravity to Estimate Accelerometer Orientation", Wearable Computers, 2003, Proceedings Seventh IEEE International Symposium on Oct. 21-23, 2003, Piscataway, NJ, IEEE, Los Alamitos, CA, Oct. 21, 2003, XP010664902, DOI:10.1109/ISWC.2003.1241424.

International Preliminary Report on Patentability for International Application PCT/EP2013/057505, Report Issued Nov. 24, 2014, Mailed Nov. 24, 2014, 17 pages.

* cited by examiner

INFORMATION DETERMINATION IN A PORTABLE ELECTRONIC DEVICE CARRIED BY A USER

FIELD OF THE INVENTION

The invention relates to the determination of information in a portable electronic device. More specifically, but not exclusively, the invention relates to the determination of a location of the device relative to a user and may also relate to the determination of the orientation of the user relative to a reference frame.

BACKGROUND OF THE INVENTION

Recently, applications and services provided by portable electronic wireless devices or by devices interacting with a portable electronic device carried by a user have become popular. It would be desired for some applications and services to know the location of the portable electronic device relative to the user and the orientation of the user.

As a whole, users of portable electronic devices, such as smart phones, carry their devices in a variety of different locations relative to their bodies when they are walking or standing. For instance, they may carry a mobile phone in their hand, trouser pocket or handbag. In general there is also a tendency for users to pay little attention to the orientation of a carried portable electronic device, especially when not using and interacting with the device. This means that, for most portable electronic devices, without imposing requirements on where and how a user must carry the device, which might be inconvenient to the user, information concerning the orientation of the device relative to the user, as well as the location of the device on the user, is not available to the device itself and also, therefore, not available to any applications running on the device or systems which might communicate with the device.

It is known to determine the orientation of a portable electronic device relative to the Earth, as well as its longitude and latitude. However, creating a suitable and practical means by which a portable electronic device could either determine its location on the body of a user without having to be at a certain orientation to the user, or determine its orientation relative to a user's body without having to be at a certain location on the user would be useful and would allow for significant further development of portable electronics technologies, for instance in new applications.

It is known to use a combination of accelerometers and gyroscopes within a mobile phone to estimate the location of the phone on the body of a user, for a number of different on-body locations, when the user is walking. However, in order to provide accurate results, these methods take a significant amount of time to execute and require a lot of computational processing. Gyroscopes are also prone to drift, which can introduce a growing error in their readings over time.

It is further known to estimate the direction (bearing) in which a user's body is facing by analysing a history of portable electronic device longitude and latitude positions recorded as the user moves. However these techniques are dependent on the presence of infrastructure external to the device, such as the Global Positioning System (GPS), which limits their use to environments with suitable reception. Further to this, frequent positioning with systems such as GPS demands a significant amount of battery power.

The invention was made in this context.

SUMMARY OF THE INVENTION

According to the invention, there is provided a method of determining the location relative to a user of a device carried by the user, comprising determining a mathematical representation of a transformation between a device reference frame and an earth reference frame at the device; receiving information from a sensor arrangement of the device capable of measuring movement of the device while the user is walking, and transforming information from the sensor arrangement, using said mathematical representation, into the earth reference frame at the device; and performing statistical analysis on at least one component of the information from the sensor arrangement obtained in the transformation to identify one or more features corresponding to a specific location of the device.

The sensor arrangement may comprise an accelerometer arrangement and the information from the sensor arrangement may comprise acceleration information of the device, in which case, the at least one component may comprise a horizontal component or a vertical component of the acceleration information. Furthermore, the sensor arrangement may comprise a magnetometer arrangement, in which case the at least one component may, alternatively or additionally, comprise a component of magnetic information. In other words, the mathematical representation would allow the device to determine at least a vertical component or a horizontal component of the sensor arrangement information.

Performing statistical analysis on the at least one component may comprise performing Principal Component Analysis. Moreover, performing statistical analysis on the at least one component may comprise determining at least one statistic of the information and comparing the statistic with stored data for different device locations to determine the location of the device relative to the user.

According to the invention, there is also provided a method of determining the orientation of a user's body relative to a reference frame, in a device carried by a user, the method comprising determining a location relative to the user of the device; and selecting a method out of a plurality of methods for determining the orientation of the user relative to the reference frame, based on the determined location of the device.

The device may comprise a sensor arrangement. The sensor arrangement may be capable of detecting and measuring a measurable effect experienced by the device which changes cyclically in dependence on the gait cycle of the user during walking and may comprise at least one accelerometer arrangement capable of measuring acceleration in three-dimensions. Furthermore, the reference frame may comprise a first reference frame and a number of methods of the plurality of methods may comprise selecting one or more periods within a user's gait cycle according to the determined location of the device, the one or more periods within the user's gait cycle being one or more periods during which the device movement is predominantly in a predetermined direction relative to a second reference frame corresponding to the reference frame of the user; measuring the acceleration of the device during the one or more periods; and estimating the user's orientation relative to the reference frame from the measured acceleration.

In one or more of the plurality of methods, estimating the user's orientation relative to the first reference frame may comprise determining that the direction of acceleration during the one or more periods is the predetermined direction relative to the second reference frame.

In one or more alternative methods of the plurality of methods, estimating the user's orientation relative to the first reference frame may comprise performing statistical analysis on acceleration data measured during the one or more periods. In this case, performing statistical analysis may comprise performing principal component analysis on acceleration data measured during the one or more periods and determining that the direction of one of the principal components corresponds to the predetermined direction relative to the second reference frame.

The reference frame may be an earth reference frame; and the method may further comprise determining a mathematical representation of a transformation between a device reference frame and the earth reference frame, and the plurality of methods may comprise using measured acceleration information which has been transformed into the earth reference frame using the mathematical representation. The sensor arrangement may further comprise a magnetometer arrangement and prior to determining the mathematical representation, the method may further comprise receiving information from the accelerometer arrangement and the magnetometer arrangement; analysing the received information from the accelerometer arrangement to determine that the user is standing and, in response to a determination that the user is standing, determining a first axis of the earth reference frame relative to the device reference frame corresponding to the vertical direction, from the received information; determining a second axis of the earth reference frame relative to the device reference frame, corresponding to the direction of north based on received information from the magnetometer arrangement and the determined vertical direction relative to the device; and determining a third axis of the earth reference frame relative to the device as being orthogonal to the first and second axis, wherein determining a mathematical representation may comprise determining a mathematical representation of the transformation between a set of three orthogonal axis of the device reference frame and the determined first, second and third axis of the earth reference frame.

Additionally, the method may further comprise determining the orientation of a user's body relative to a device reference frame by using the mathematical representation to transform the determined orientation of the user relative to the earth reference frame into the device reference frame.

Furthermore, according to the invention, there is provided a computer program comprising instructions that when executed by a processor cause the processor to carry out one or more of the above methods.

According to the invention, there is also provided a device for determining its location relative to a user when carried by the user, comprising a controller; a memory for storing information corresponding to a mathematical representation of a transformation between a device reference frame and an earth reference frame at the device and statistical features related to different locations of the device; and a sensor arrangement capable of measuring movement of the device, wherein the controller is configured to receive information from said sensor arrangement obtained while the user carrying the device is walking, transform said information, using said mathematical representation, into the earth reference frame at the device and perform statistical analysis on at least one component of the information in the earth reference frame to identify at least one feature corresponding to at least one of said stored statistical features to identify the location of the device.

The sensor arrangement may comprise an accelerometer arrangement, and the sensor information may comprise acceleration information from said accelerometer arrangement. The at least one component may comprise a horizontal component or a vertical component of the acceleration information. Additionally, the sensor arrangement may comprise a magnetometer arrangement.

The controller may be configured to perform Principal Component Analysis on said at least one component to identify said at least one feature.

The earth reference frame may comprise a reference axis corresponding to the vertical direction and a plane corresponding to the horizontal plane. The controller may be configured to receive sensor information from said sensor arrangement obtained while the user carrying the device is standing, analyse the received sensor information to determine if the user is standing and, in response to a determination that the user is standing, determine the direction of the reference axis of the earth reference frame relative to the device reference frame from said sensor information obtained while the user is standing. The controller may be configured to determine the mathematical representation by determining a mathematical representation of the transformation between a set of three orthogonal axis of the device reference frame and the reference axis and the reference plane.

According to the invention, there is also provided a device for determining the orientation of a user, carrying the device, relative to a reference frame, comprising a memory for storing information about a plurality of methods for determining the orientation of the user relative to the reference frame; and a controller configured to receive information about the location of the device relative to the user and select a method out of the plurality of methods, based on said information about the location of the device.

The device may comprise a sensor arrangement and the controller may be configured to determine, as part of a number of the plurality of methods, timings of the user's gait cycle using information from said sensor arrangement.

The sensor arrangement may comprise an accelerometer arrangement for measuring acceleration of the device in three-dimensions, the reference frame may comprise a first reference frame, and the controller may be configured to, as part of said number of the plurality of methods, select one or more periods within a user's gait cycle based on the information about the location of the device, the one or more periods being one or more periods during which the device movement is predominantly in a predetermined direction of a second reference frame corresponding to the reference frame of the user, select acceleration data obtained by the acceleration arrangement during the one or more periods; and estimate the user's orientation relative to the first reference frame from the acceleration data.

Additionally, the controller may be configured to estimate, in one or more of the plurality of methods, the user's orientation relative to the first reference frame by determining that the direction of acceleration, during the one or more periods, corresponds to the predetermined direction relative to the second reference frame.

Furthermore, the controller may be configured to estimate, in one or more alternative methods of the plurality of methods, the user's orientation relative to the first reference frame by performing principal component analysis on acceleration data measured during the one or more periods and determining that the direction of one of the principal components corresponds to the predetermined direction relative to the second reference frame.

The memory may further be configured to store a mathematical representation of a transformation between a third reference frame, corresponding to a device reference frame, and the first reference frame, and the controller may be further configured to transform measured acceleration information into said first reference frame using said stored mathematical representation.

Alternatively, the controller may be further configured to determine the orientation of the user's body relative to a device reference frame by using the mathematical representation to transform the determined orientation of the user relative to the first reference frame into the device reference frame.

BRIEF DESCRIPTION OF THE DRAWINGS

Embodiments of the invention will now be described, by way of example, with reference to FIGS. 1 to 7 of the accompanying drawings, in which.

DETAILED DESCRIPTION

Figure 1:
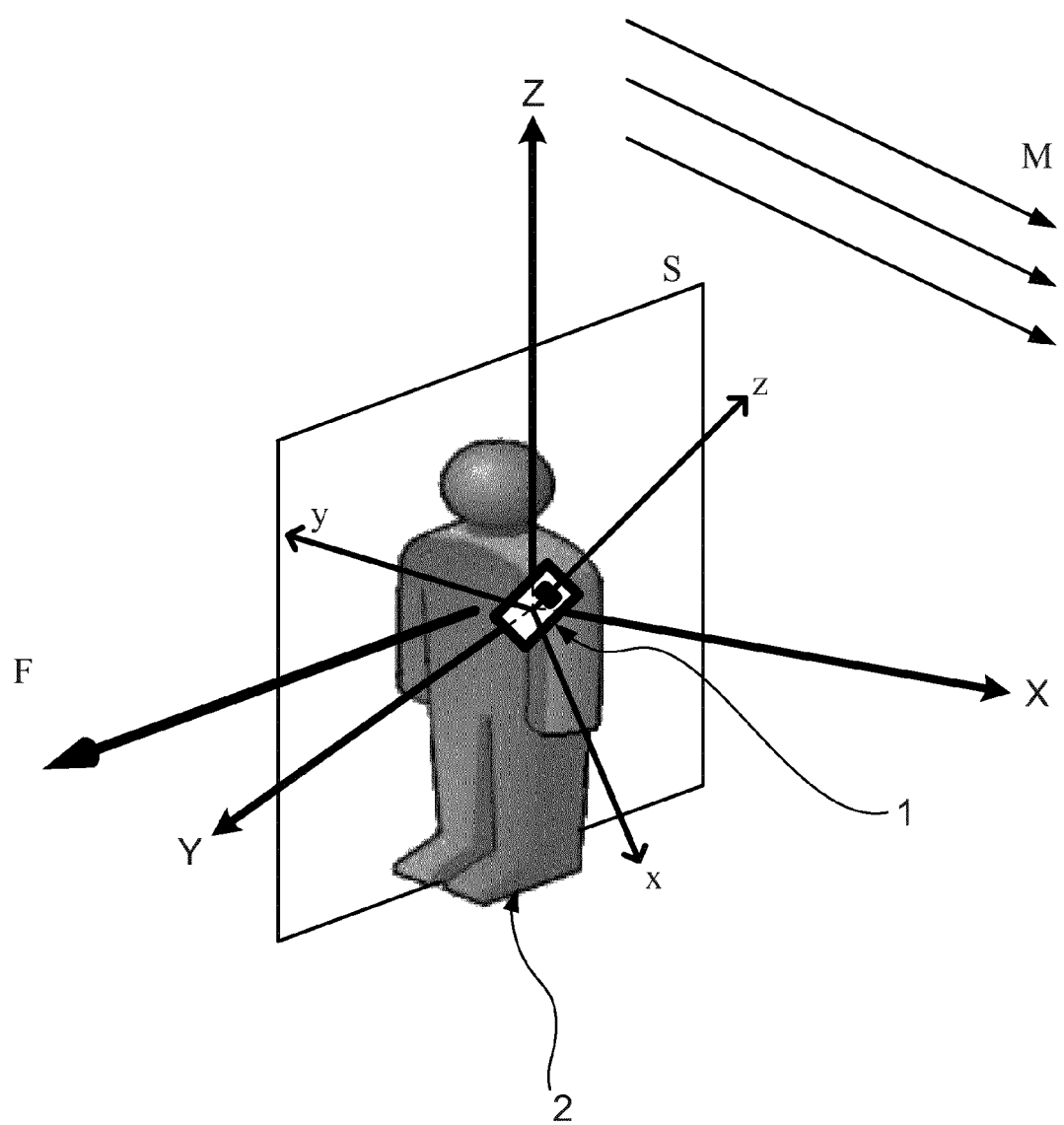
FIG. 1 is an illustrative perspective view of a user with a portable electronic device.

With reference to FIG. 1, a portable electronic device 1 carried by a user 2 at a certain location on the Earth is shown. The portable electronic device can be used to determine information about the device and the user.

In FIG. 1, there is also shown an earth reference frame comprising three orthogonal axes X, Y and Z, a device reference frame comprising three orthogonal axes x, y and z and a user reference plane S comprising a vertical plane corresponding to the user's anatomical sagittal plane. These reference geometries may be used to determine the information about the user 2 and the device 1.

The origin of the earth reference frame axes (X, Y, Z) lies at the portable electronic device 1. The X axis of the earth reference frame corresponds to the approximate horizontal direction of True North from the portable electronic device. True North is the direction of the Geographic North Pole from any point on the Earth's surface and is usually distinct from Magnetic North, which is the direction of the Magnetic North Pole from any point on the Earth's surface. Moreover, the Y axis of the earth reference frame corresponds to the approximate horizontal direction of true East at the location of portable electronic device. The Z axis of the earth reference frame corresponds approximately to the direction opposite to that of the gravity vector at the portable electronic device, in other words the upwards direction at the portable electronic device. As a result, the X-Y plane is approximately horizontal relative to the user 2. The Z axis will therefore be referred to as the vertical axis and the X-Y plane will be referred to as the horizontal plane.

The origin of the device reference frame axes (x, y, z) also lies at the portable electronic device 1, and the device reference frame lies at a given orientation relative to the physical structure of the portable electronic device. The portable electronic device 1 itself may lie at any given orientation relative to the earth reference frame (X, Y, Z) or the user 2.

The device 1 is shown as being located approximately on the left shoulder of the user's body. However, the carried device could be located at a plurality of possible locations relative to the user's body, for example in one of the user's hands, in one of the user's trouser pockets, on the user's chest or head, or in equipment carried by the user such as a handbag or rucksack.

The horizontal direction in which the user's body faces F can be defined as a horizontal vector pointing away from the user's chest in the sagittal plane S. The user's body facing direction F lies at a bearing relative to True North (X). A user reference frame comprising three orthogonal axes, where a first axis corresponds to the user facing direction (F) and a second axis corresponds to the vertical earth axis (Z), can be used to define the orientation of the user relative to the device reference frame (x, y, z) or the earth reference frame (X, Y, Z).

It should be understood that, although the present invention is described herein with reference to the reference geometries described with reference to FIG. 1, the concept of the invention could be implemented with different reference geometries. For example, the earth reference frame may not be aligned with True North and East. The earth reference frame may be any reference frame which allows the orientation of the device or the user relative to earth or the local environment to be determined. Moreover, it will be appreciated that the terms "vertical" and "horizontal" should not be interpreted to mean exactly "vertical" or "horizontal" respectively, but include planes and axes substantially in the directions considered vertical or horizontal.

Figure 2:
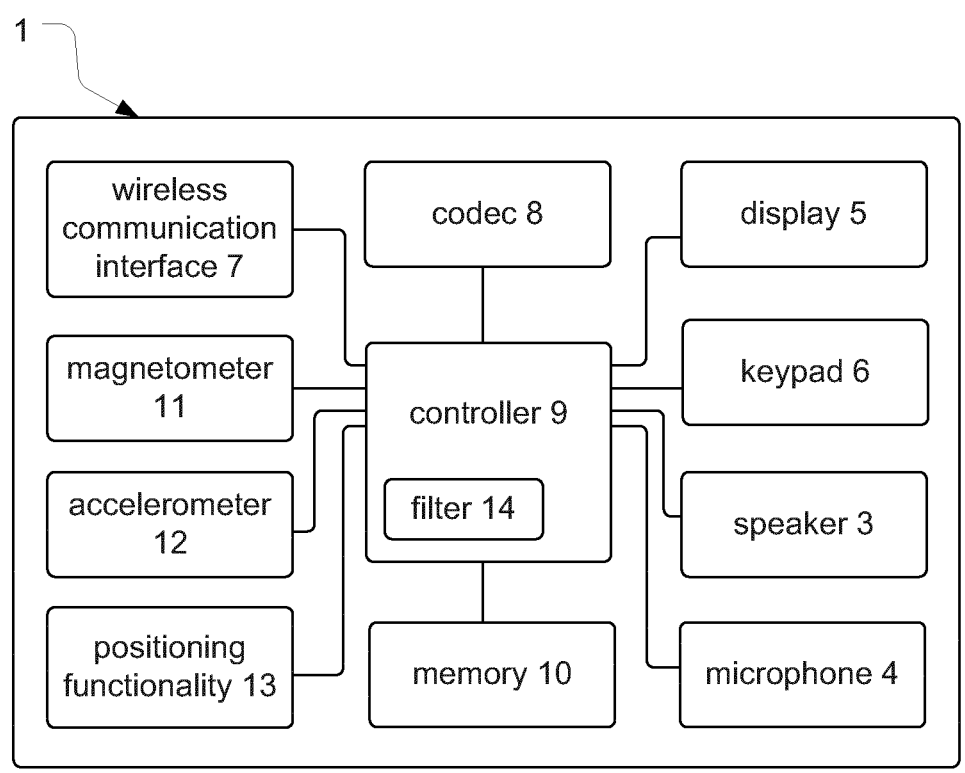
FIG. 2 is a schematic diagram showing the components of a portable electronic device in the form of a mobile communication device.

With reference to FIG. 2, a schematic diagram of a portable electronic device 1 in the form of a mobile communication device is shown. The mobile communication device may, for example, be in the form of a smart phone. The portable electronic device could, however, be any type of portable electronic device suitable for implementing the invention. The mobile communication device 1 comprises a user interface provided by a speaker 3, a microphone 4, a display 5, and a keypad 6. The display 5 and the keypad 6 may both be provided by a touch screen.

The mobile communication device 1 can communicate through one or more networks, which may include but are not limited to GPRS, GSM, UMTS, LTE, LTE-A, WiFi and a network including a communication satellite. To this end, the mobile communication device also comprises a wireless communication interface 7 and a codec 8. The wireless communication interface may for example be an RF interface but can alternatively be any other suitable type of wireless interface.

The wireless communication interface 7 may comprise one or more antennas and a processing stage for receiving and processing wireless communication signals. The codec 8 translates signals received via the wireless communication interface into a format that can be communicated to a user 2 of the mobile communication device 1 via the speaker 3 and display 5. Similarly, audio and data signals generated in the mobile communication device can be processed by the codec 8 into a form that can be transmitted by the wireless communication interface.

The components of the mobile communication device 1 are controlled by a controller 9. The controller 9 may be a central processing unit (CPU) or a microcontroller (MCU). The mobile communication device also comprises a memory 10 for storing data and instructions. The memory may include a Subscriber Identity Module (SIM) card and, for example, a flash memory. The memory may comprise stored data and instructions for allowing the location of the device and/or the facing direction of the user to be determined, as will be described in more detail below.

In some embodiments, the controller 9 may run an Android, iOS, Windows Phone, Blackberry or Symbian operating system. However, it should be realised that the above operating systems are just examples and any suitable operating system for the mobile communication device 1 can be used.

The mobile communication device 1 may comprise a sensor arrangement. The sensor arrangement may comprise a magnetometer 11. Additionally, the sensor arrangement may comprise an accelerometer 12. However, it will be appreciated that the sensor arrangement is not limited to comprising both a magnetometer and an accelerometer, as will be described in more detail below. The mobile communication device may further comprise a positioning functionality 13 for estimating the longitude and latitude of the location of the mobile communication device on the Earth's surface.

The magnetometer 11 may be a vector magnetometer that measures the Earth's magnetic field vector local to the device 1. At any point on the Earth, the Earth's magnetic field can be represented by a three-dimensional vector. The vector will typically comprise both horizontal and vertical components since, on either side of the equator, as one moves either North or South, the Earth's magnetic field dips towards the centre of the Earth in order to enter the Magnetic Poles. The vector magnetometer may, for example, comprise a three-axis fluxgate magnetometer that operates with a specific minimum sampling frequency and is capable of calculating the magnitude and direction of the total magnetic field from the field strength readings of its three orthogonal sensors. As a specific example, it can be a Hall effect magnetometer such as the 3-axis Electronic Compass AK8973 magnetometer from Asahi Kasei Microsystems. However, any suitable magnetometer can be used.

The accelerometer 12 may be a three-axis accelerometer arrangement that measures proper acceleration with a range of measurement and sampling frequency appropriate to implement the invention. A single-axis accelerometer at rest on the Earth's surface will measure a weight per unit of mass approximately equal to the value of standard gravity ($g_o \approx 9.807$ N/kg) when its axis of sensitivity is vertically aligned. A three-axis accelerometer comprises accelerometer components orientated relative to each other such that, together, they measure proper acceleration in three orthogonal directions. This information can then be used to calculate the vector quantity of proper acceleration experienced by the device 1. This calculation may, for example, be performed by a processing capability within the three-axis accelerometer arrangement, or it could be performed by the controller 9. The three-axis accelerometer might, for example, be a micro-electro-mechanical systems (MEMS) chip, for instance the AK8976A by Asahi Kasei Microsystems, which is used in a number of smart phones. However, any suitable accelerometer can be used.

The orientation of the sensing axes of the vector magnetometer n and the three-axis accelerometer 12 is fixed relative to the device reference frame, and information concerning this relative orientation is stored on the device memory 10. Using this information, the controller 9 of the portable electronic device 1 will typically translate directional information it obtains from measurements made by the vector magnetometer n and the three-axis accelerometer 12 to the device reference frame (x, y and z) before using the translated measurement data further.

The positioning functionality 13 of the mobile communication device 1 may, for example, be a system for using GPS. Such a GPS system may, for example, comprise a Wide Area Augmentation System (WAAS) enabled GPS receiver module with an integrated antenna capable of simultaneously monitoring a plurality of satellite communication channels. Further, such a GPS system might, for instance, relay position information to the controller 9 using the NMEA 0183 protocol. As a specific example, the GPS system might be an Assisted GPS (A-GPS) or a Differential GPS (DGPS). Alternatively, the positioning functionality may, for example, be a system for estimating the position of the device using other wireless communication technology such as a network of Wi-Fi access points, or by using Bluetooth or even ultra-wideband (UWB) transceivers. For simplicity, hereinafter the positioning functionality 13 will be referred to as a GPS system. However, it will be appreciated that any suitable positioning functionality can be used.

The memory 10 may store information for enabling the controller to perform a plurality of processes and may include a set of instructions and algorithms that form part of one or more programs. The programs may be implemented in software, hardware or a combination of both. One or more of the programs may be or form part of application software, referred to as "apps". One of the programs stored in memory may, when run by the controller 9, interface with sensors in the mobile communication device, for example the accelerometers, to determine the location of the device 1 relative to the body of the user 2. The same or another of the program may interface with sensors in the mobile communication device, for example the accelerometers, to estimate the facing direction F of the user relative to the earth reference frame (X, Y, Z). The one or more programs may comprise instructions for interfacing with the user interface of the portable device, the codec 8 and the wireless communication interface 7. The one or more programs may also cause information concerning the location of the device relative to the user's body, or the facing direction of the user, to be displayed to the user via a graphical user interface. This may, for example be done by displaying the location of the device relative to the user's body graphically, or by graphically displaying the facing direction of the user in relation to a map of their surroundings.

One or more of the programs may additionally share information concerning either the location of the device 1 relative to the user's body or the facing direction F of the user 2 with other programs run from the memory 10 or running externally to the device, for instance running on embedded devices in a user's surroundings. For example, a program for estimating the facing direction F of the user, if separate from a program for determining the location of the device, may receive information about the location of the device from the program for determining the location of the device. Alternatively, if the portable electronic device does not include a program for determining the location of the device from sensor data, a user may enter the location of the device and the portable electronic device may comprise functionality for receiving information indicating the location of the device from the user via the graphical user interface. One or more of the described programs can form part of one or more "apps".

The memory 10 may also store algorithms for use by the controller 9 in performing digital filtering of measurements sampled from the three-axis accelerometer and vector magnetometer, as will be described with reference to FIG. 3. The controller can therefore be considered as having a digital filtering capability 14. It will be appreciated that the components of FIG. 2 is just an example and that the filtering capability 14 may alternatively be provided as a dedicated filter separate from the controller 9.

The memory 10 may also store algorithms for use by the controller 9 in performing statistical classification of accelerometer and magnetometer data as will be described with reference to FIG. 3. As will be described in more detail below, the memory 10 may also comprise stored information about the value of magnetic declination at different locations on the Earth's surface. Magnetic declination is the angle between Magnetic North and True North. Additionally or alternatively, the memory 10 may comprise data indicating different device locations and associated instructions for determining the facing direction, as will be described in more detail below.

Figure 3:
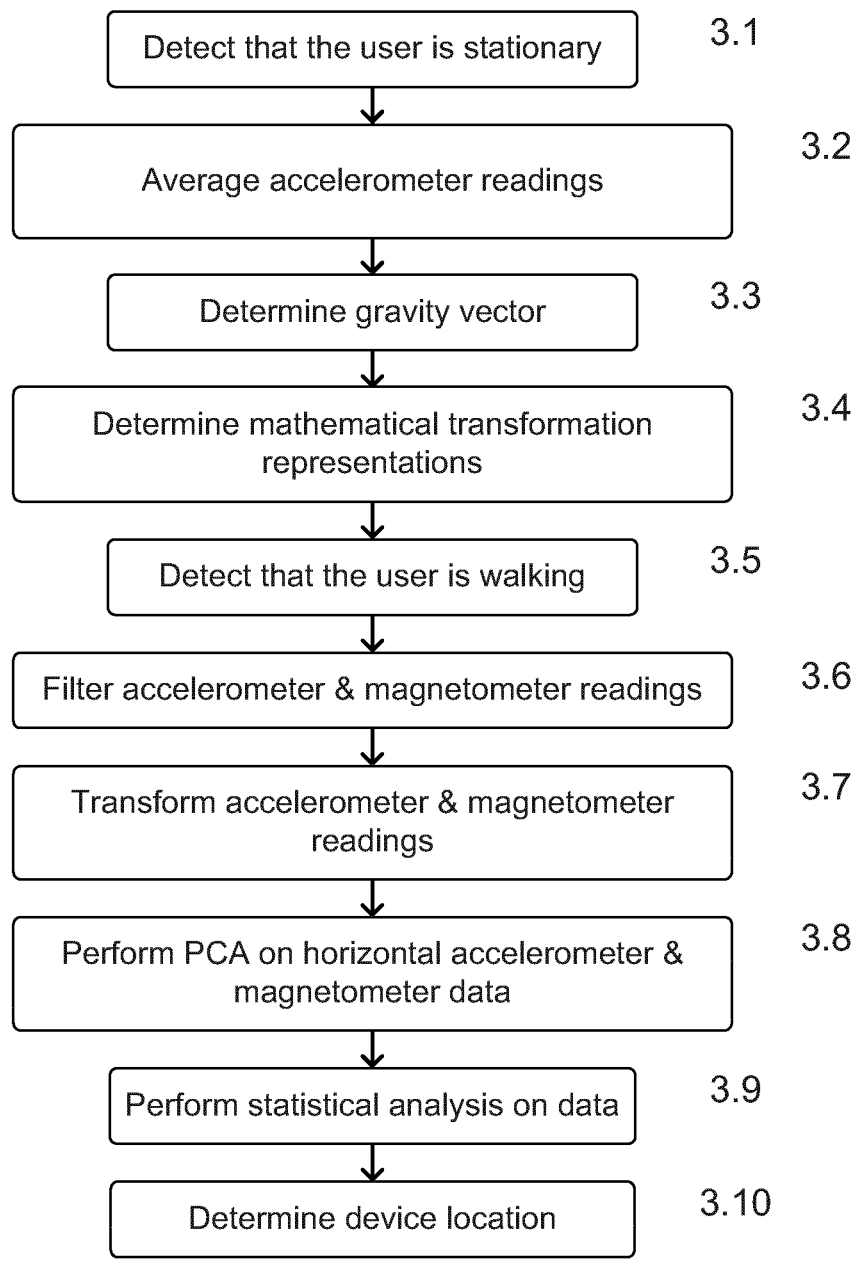
FIG. 3 illustrates a process for a portable electronic device to determine its location relative to the body of a user.

With reference to FIG. 3, a process is shown which illustrates a method of the invention of determining the location of a portable electronic device 1 relative to a user's body 2. To determine the location of the device 1, the device will first need to calibrate itself by determining a mathematical representation of the transformation between the device reference frame and the vertical axis and a horizontal plane of the earth reference frame. The calibration is carried out when the user 2 is standing. The portable electronic device 1 may detect that the user is stationary at step 3.1 by monitoring the accelerometer readings from the three-axis accelerometer 12 over a given time period. The portable electronic device may for example determine that the user is stationary if the variance of the accelerometer readings over the given time period is approximately zero.

At step 3.2, the portable electronic device 1 then begins a calibration phase by averaging measured acceleration stored in the memory 10 from the sampled time period of step 3.1. At step 3.3, the average of the three-axis accelerometer 12 measurements when the portable electronic device 1 is stationary is used to determine the gravity vector local to the device. The orientation of the vertical axis, Z, of the earth reference frame relative to the device reference frame is then determined by the device as the inverse of the gravity vector. The three-dimensional direction of the vertical axis relative to the device reference frame may then be stored in the device memory 10. For example, it may be stored in the memory in the form of a three character string corresponding to the directional cosines of a unit vector representation Z of the vertical axis relative to the device axes. From this, the controller 9 is now able to determine the horizontal plane of the earth reference frame as being perpendicular to the Z axis. If appropriate, the orientation of the horizontal earth reference plane relative to the device reference plane may also be stored in the memory 10.

Now that the orientation of the earth reference frame Z axis is known the portable electronic device 1 calculates a mathematical representation of the transformation between the earth reference frame Z axis and horizontal plane and the device reference frame (x, y, z), at step 3.4. This mathematical representation may, for example, be a transformation matrix determined by calculating Euler angles.

The calibration provided by steps 3.2 to 3.4 can now be considered to be complete. It should be understood that methods other than those described for FIG. 3 could be used to determine the orientation of a portable electronic device 1 relative to an earth reference frame such that mathematical representations of the transformation between the two reference frames can then be calculated. For example data from other types of sensors may be used instead of or in addition to those described, the sensor data may be analysed in different ways or the user 2 could manually input parameters which would describe the orientation of the device relative to an earth reference frame. For example, the calibration process described with reference to steps 3.2 to 3.4 of FIG. 3 could be performed using information from a sensor arrangement comprising any type of sensors capable of providing sensory measurements from which the vertical direction at the device could be determined. The calibration described above is one example of a calibration suitable for determining the location of the device relative to the user's body. However, if the device location is then used to determine the facing direction of the user an extended calibration process, using additional sensor data, may be used instead as will be described in more detail below.

To determine the location of the device 1, the device uses sensor data obtained while the user 2 is walking. It is contemplated that, in some implementations, the device may display a message to the user, informing the user that the calibration is complete and that the user can start walking. However, in other implementations, the device does not display a message. The device automatically detects that the user has started walking at step 3.5.

To determine that the user is walking forwards, the controller may use a number of different approaches, including using simple threshold based approaches when the activities are limited to only walking and standing, using more complex activity recognition systems that can detect walking from daily life activities or using recorded data from the GPS system. Alternatively, the controller 9 may begin using the mathematical transformation representation to extract vertical acceleration readings, parallel to earth reference frame Z axis, from the three-axis accelerometer 12 samples measured in the device reference frame. The controller may then detect that the user is walking by recognising vertical acceleration behaviour corresponding to information on human walking locomotion stored on the device memory 10.

The determination of the location will be described below as using both accelerometer and magnetometer data obtained while the user is walking. However, it will be appreciated that only one of accelerometer and magnetometer data or other suitable sensor data may be used, as will be described in more detail below. The controller 9 begins digitally filtering measurements from the accelerometer 12 at step 3.6. The controller also begins digitally filtering measurements from the magnetometer 11. The controller 9 filters the measurements in order to remove high frequency noise. For example, a 5 Hz mean filter may be adopted for acceleration and magnetic field vector data, or a simple averaging filter may be used to mitigate the effect of non-deterministic magnetic interference. The filter may be implemented in the controller 9 as shown in FIG. 2. Alternatively, the filtering may be performed by dedicated digital or analogue filter hardware within the device 1.

At step 3.7, the controller uses the mathematical transformation stored on the memory 10 to transform the accelerometer measurements to the earth reference frame. The controller also transforms magnetometer measurements into the earth reference frame. The device 1 may then separate the vertical and the horizontal components of the accelerometer data. The device may similarly extract vertical and/or horizontal components of the magnetometer data. Further filtering of the sensed and transformed data may take place at this point and may comprise filtering techniques similar to those described above regarding step 3.6. The controller 9 may then perform Principal Component Analysis (PCA) on the horizontal accelerometer data at step 3.8. PCA identifies axes (principal components) within multi-dimensional data on which the data varies the most, such that the greatest variance of the data is found on the first principal component, the second greatest variance is on the second principal component, and so on. Principal component analysis is known in the art and will not be described in detail herein. The controller 9 may also perform PCA on magnetometer data at step 3.8 or on the determined horizontal component of the magnetometer data.

At step 3.9, the portable electronic device 1 then performs statistical analysis on the data sets pertaining to the measurements of the accelerometer 12, whereby at least one of the data sets pertaining to the three-axis accelerometer 12 comprises data which has been transformed into earth reference frame components and may further have been resolved into a number of its principal components through principal component analysis. The intention of this statistical analysis is to determine certain statistical characteristics, or features, of each aforementioned set of data, such as, for example, the variance, interquartile range, mean, mean frequency, intensity, or the spectral variance, so that these characteristics can then be compared to stored statistical characteristics in memory 10 to identify the likely location of the device 1 relative to the user's body 2.

At step 3.10, the controller 9 of the portable electronic device 1 can then identify the likely location of the device relative to the user's body 2 based on the determined statistical characteristics of the movement of the device. The controller may identify the likely location by, for example, using a statistical classifier algorithm stored in the device memory 10. A statistical classifier is an algorithm developed through machine learning which aims to identify sub-populations to which new data observations belong, where the identity of the sub-population is unknown, on the basis of rules learnt through previous analysis of data containing observations whose sub-population is known. For example, a Bayesian classification procedure might be used. Statistical classification is known in the art and will not be described in detail herein. The device 1 may determine a location indicator, indicating the location of the device and store the indicator in memory 10. It is contemplated that the location indicator may be a unique set of data, for instance a unique byte array, and that each location has a different location indicator.

As mentioned above, magnetometer data may also be used in the process of determining the location. Measurements from the magnetometer during the movement of the device 1 during walking could be used in the statistical classification of the device location in addition to or in place of accelerometer data. As has been described with reference to accelerometer data, additional beneficial information can be gained by transforming the magnetometer data into the earth reference frame before performing the statistical analysis. Statistical analysis can then be performed on at least one out of a vertical or horizontal component of the magnetometer data. Alternatively, or additionally, the magnetometer data can provide valuable pseudo-rotational information which would further help to increase the accuracy of the classification process. Such rotational data could instead be provided by the inclusion of a three-axis gyroscope in the portable electronic device. However, the processing of magnetometer data is more computationally efficient than the processing of gyroscope data that would be required to achieve a corresponding result. The controller 9 may then perform Principal Component Analysis (PCA) on this rotational data and use the determined principal component information in the statistical classification of the device location.

It should therefore be understood that the advantages of the process described with reference to FIG. 3 can be attained by performing the statistical analysis of step 3.9 on data sets pertaining to the measurements of other types of sensors of the device to those described provided that those sensors are capable of measuring movement of the device. Moreover, the process of determining the location may also involve, in addition to statistical analysis on components of the sensor data, statistical analysis on acceleration, magnetometer and/or other sensor data that has not been transformed into the earth reference frame.

The use of movement data, which may have been measured in three-dimensions and which has been transformed into earth reference frame components, in the statistical classification of the device location provides valuable information which increases the accuracy of the classification process above that which would be achieved using raw data. The same is also true for the use of PCA data, concerning horizontal components of movement data, in the statistical classification of the device 1 location. The processes described herein therefore provide a more accurate method of determining the location of a portable electronic device 1 relative to a user's body 2 than known methods. Due to this increased accuracy, the methods described also provide for the determination of the location of a device relative to a user over a shorter sampling period than previous methods. Moreover, the method of FIG. 3 does not necessitate interaction with, or reliance on, systems or infrastructure external to the device.

Having a reliable and fast method for determining the location of a device relative to a user's body, as provided by the process described with reference to FIG. 3, would offer immediate benefits to many existing portable electronic device applications, for example a device could be configured to execute certain software procedures when it determines that it is being carried at a certain location on the user. For example, the device might launch a music playing software function when it determines that it is being carried on the upper arm of a user.

It should be understood that, although FIG. 3 has been described with reference to the components of FIG. 2, any type of suitable portable electronic device could be used for implementing the process described in FIG. 3.

Figure 4:
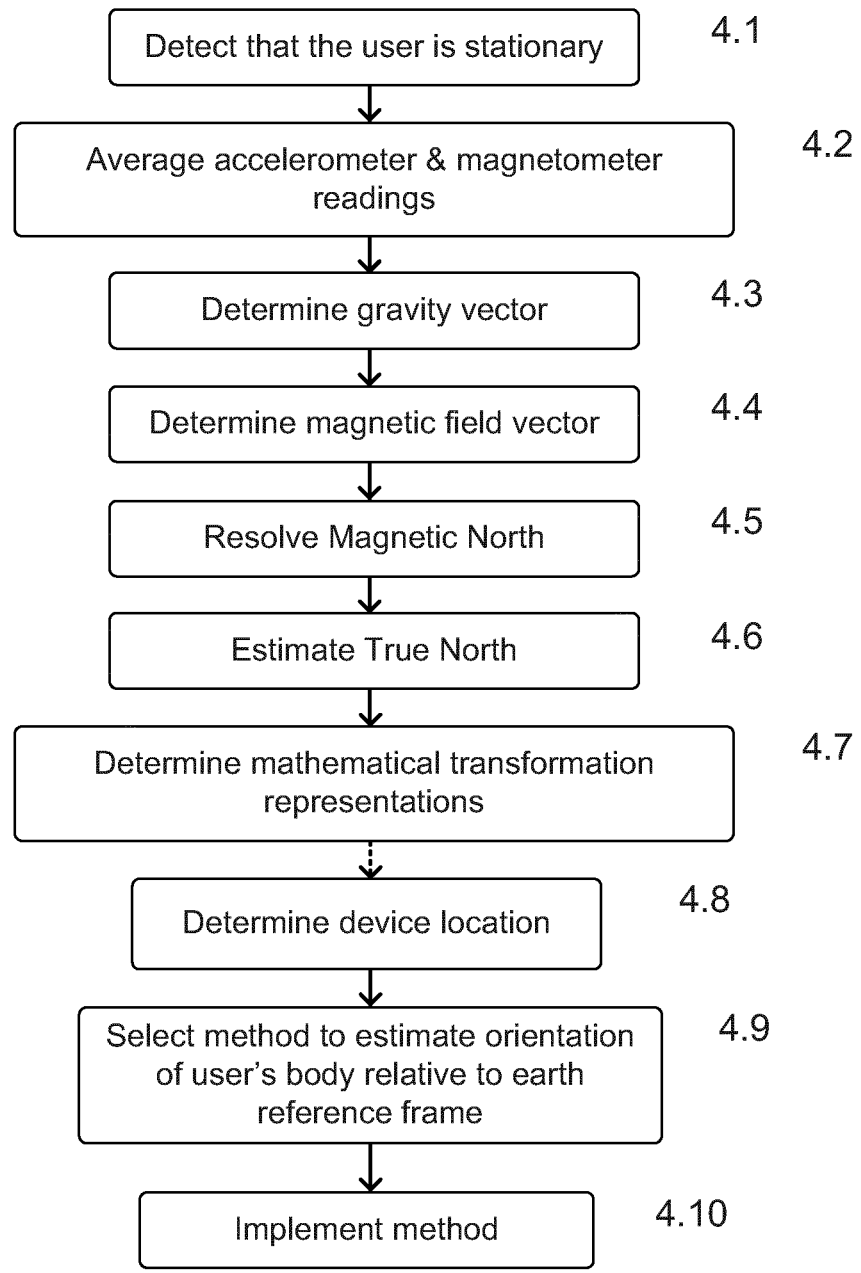
FIG. 4 illustrates a process for a portable electronic device to select a method to determine the orientation of a user's body based on a location of the device relative to the user's body.

With reference to FIG. 4, a process is shown for selecting a method for determining the orientation of a user 2 of a portable electronic device 1, for example the portable electronic device shown in FIG. 2. As an example, it will be described with respect to FIG. 4 how to determine the facing direction. However, the process of FIG. 4 could be used to determine a different aspect of the user's orientation. To determine the facing direction of the user, the device first needs to calibrate itself by determining a mathematical representation of the transformation between the device reference frame and the earth reference frame (X, Y, Z). A calibration process for determining a transformation between the device reference frame and the vertical axis and a horizontal plane of the earth reference frame was described with respect to FIG. 3. However, to determine the facing direction F of a user 2, a full transformation between the device reference frame and the earth reference frame (X, Y, Z) is required. One possible approach for obtaining this transformation, which includes the steps of the calibration process described with respect to FIG. 3 and also some additional steps, will be described with respect to FIG. 4.

As described with respect to FIG. 3, a calibration is carried out when the user 2 is standing. The portable electronic device 1 detects that the user is stationary at step 4.1 by monitoring the accelerometer readings from the accelerometers 12 over a given time period. The portable electronic device may for example determine that the user is stationary if the variance of the accelerometer readings over the given time period is approximately zero. At step 4.2, the portable electronic device 1 then begins a calibration phase by averaging measured acceleration and magnetic field vector M samples stored in the memory 10 from the sampled time period of step 4.1. At step 4.3, the gravity vector is determined from the accelerometer data, as has already been described with respect to step 3.3 of FIG. 3. The three-dimensional direction of the vertical axis relative to the device reference frame is then determined and stored in the device memory 10, as has also already been described. For example, the direction of the vertical axis may be stored in the memory 10 in the form of a three character string.

To obtain the full transformation, the controller 9 then obtains the Earth's magnetic field vector local to the portable electronic device 1 from the averaged vector magnetometer 11 measurements at step 4.4. This information may then be stored on the device memory 10. The total magnetic field strength is not important to this procedure, so the controller may, for example, store the magnetic field vector M as a unit vector in a three character string corresponding to its directional cosines relative to the device axes. The controller then approximates the horizontal direction of Magnetic North ($N_M$) at step 4.5 by resolving the component of the averaged magnetic field vector at the device $M_{av}$ perpendicular to the vertical axis Z, by taking the cross product of the vector along the vertical axis and the magnetic flux vector, and then further taking the cross product of this result and the vector along the vertical axis, as follows:

$$N_M = Z \wedge M_{av} \wedge Z \quad (1)$$

At step 4.6, the portable electronic device 1 then uses information from the GPS system 13, indicating the global location of the device in longitude and latitude, in conjunction with stored information about the value of magnetic declination at different locations on the Earth's surface and the direction of $N_M$ relative to the device to estimate the horizontal direction of True North relative to the device, therefore establishing the orientation of the X axis relative to the device reference frame. The controller 9 achieves this by accessing magnetic declination data stored on its memory 10 corresponding to the longitude and latitude of the device, and using this to compensate for the difference between Magnetic North and True North at that location, so determining True North. The three-dimensional direction of the X axis relative to the device reference frame may then be stored on the device memory 10, for example it may be stored as a three character string X corresponding to unit vector components in the device reference frame.

The orientation of the Y axis of the earth reference frame relative to the device reference frame, which corresponds to the horizontal direction of East relative to the device 1, is then calculated by the portable electronic device from the cross-product of the X and Z vectors, as follows:

$$Y = X \wedge Z \quad (2)$$

The three-dimensional direction of the Y axis relative to the device reference frame may then be stored by the controller 9 on the device memory 10. For example, it may be stored as a three character unit vector string Y in the same way in which the Z and X axis directions were recorded.

Now that the orientation of the earth reference frame (X, Y, Z) relative to the device reference frame (x, y, z) is known the portable electronic device 1 calculates a full mathematical representation of the transformation between the two reference frames, at step 4.7. This mathematical representation may, for example, be a transformation matrix determined by calculating Euler angles. Alternatively, it may take the form of quaternion representations. Quaternion representations are known and will not be described in detail herein. Briefly, quaternions are part of a general class of hyper-complex numbers and belong to non-commutative division algebra. Analogous to complex numbers, a quaternion (H) can also be written as a linear combination of real and imaginary parts by as follows:

$$H = w + ia + jb + kc, \text{ where } i^2 = j^2 = k^2 = -1 \quad (3)$$

Using this construction the three rotations, that exist between the earth reference frame and the device reference frame, can be written as a simple rotation around one axis as follows:

$$R(\hat{V}) = Q\hat{V}Q^* \quad (4)$$

Here R is a rotation function and Q is a quaternion that represents the rotation of a three-dimensional vector $\hat{V}$ an angle of $2\theta$ around a vector $\hat{u}$, which can be calculated as follows:

$$Q = \cos\theta + \hat{u}\sin\theta \quad (5)$$

Quaternion representations may provide computation advantages when compared to singular representations as they require only four operations as opposed to, for example, the nine operations required by Euler equations.

The calibration provided by steps 4.2 to 4.7 can now be considered to be complete. It should be understood that methods other than those described for FIG. 4 could be used to determine the orientation of a portable electronic device 1 relative to an earth reference frame (X, Y, Z) such that mathematical representations of the transformation between the two reference frames can then be calculated. For example data from other types of sensors may be used, the sensor data may be analysed in different ways or the user 2 could manually input parameters which would describe the orientation of the device relative to an earth reference frame. Consequently, it will be appreciated that the device 1 does not have to comprise, for example, a GPS system, stored information concerning the value of magnetic declination at various locations on the Earth's surface, and a magnetometer, if a method other than the calibration process of steps 4.2 to 4.7 is used to determine the mathematical transformation representations. Moreover, as mentioned above, it will be appreciated that the earth reference frame does not have to be defined in terms of the direction of the vertical axis, True North and East but can be any reference frame which allows the orientation of the device or the user relative to earth or the local surroundings to be determined.

The portable electronic device 1 then determines its location relative to the body of the user 2 at step 4.8. The location may be determined according to steps 3.5 to 3.10 of FIG. 3, but using the full mathematical transformation between the device reference frame (x, y, z) and the earth reference frame (X, Y, Z). Alternatively, the location of the portable electronic device relative to the body of the user could be determined by a different method, for example the location information could be inputted manually by the user.

At step 4.9, the portable electronic device 1 then decides which method to use in order to determine the orientation of the user as the user 2 walks forwards, depending on the known location of the device relative to the body of the user. The electronic device 1 is pre-programmed to be configured to use one of a number of different methods for determining the facing direction of the user 2 based on the location of the device relative to the user's body. According to embodiments of the invention, it is recognised that different methods are suitable for different device locations. The memory 10 may store a data structure with location indicators indicating a plurality of locations of the device and, for each location, associated algorithm identification data which indicates an algorithm to be used for the specific location of the device for determining the orientation of the user. If the location of the device 1 is obtained using the method of steps 3.5 to 3.10, the device may then use a location indicator obtained in the method to query the memory 10 and determine the associated algorithm. If the location of the device is obtained by a user 2 inputting information, the device will instead include functionality for converting the received data into a location indicator that can be used to query the memory and determine the appropriate algorithm.

It is assumed that the user 2 is walking in the forward direction and that the methods determine the forward direction using accelerometer 12 data and then take the forward direction as the facing direction. It is recognised that for some device locations, specific times of the user's gait can be identified when the acceleration measured by the device is mainly or almost solely in the forward direction and for which the acceleration data during these times can be analysed to determine the forward direction and thereby the facing direction F. For some of these locations, the acceleration data during one or more specific instances or short periods of the gait cycle can be used directly to determine the forward direction and these types of methods form a first category of methods. For other locations of the device, acceleration data during one or more periods of the gait cycle require further analysis and the methods used for these other locations form a second category of methods. The methods of the first and second categories will be described in more detail with respect to FIGS. 5 and 6 respectively. It should be noted that within these categories, different methods are also selected for different locations. Specific instances or periods of the gait cycle will have previously been determined empirically for different device locations and the portable electronic device will have been pre-programmed to select different instances or periods for different device locations.

For some locations, the methods of the first and the second categories are not appropriate and an alternative method, based on statistical analysis on sensor data obtained over a number of gait cycles, is used instead. This alternative method for determining the facing direction will also be described below.

The portable electronic device 1 then implements the selected method for determining the user's facing direction F as the user walks forwards at step 4.10.

This process of selecting a method for a portable electronic device to determine the orientation of a user relative to an earth reference frame, based on the location of the device relative to the user, allows the user's orientation to be determined accurately for a plurality of device locations, irrespective of the device orientation, while also being computationally efficient.

In addition to the process of FIG. 4, if the portable electronic device comprises a vector magnetometer 11, this could be used to monitor changes in the orientation of the device reference frame relative to the earth reference frame (X, Y, Z) during steps 4.8 to 4.11 of FIG. 4 corresponding to the user changing their orientation. For example, changes in the orientation of north relative to the device reference frame can be monitored. If a change in the user's orientation is detected this could be used to update the mathematical transformation representation accordingly. Alternatively any other means of informing the device of a change in the user's facing direction may be used to update the mathematical representation, for example, readings from a gyroscope may be used.

Figure 5:
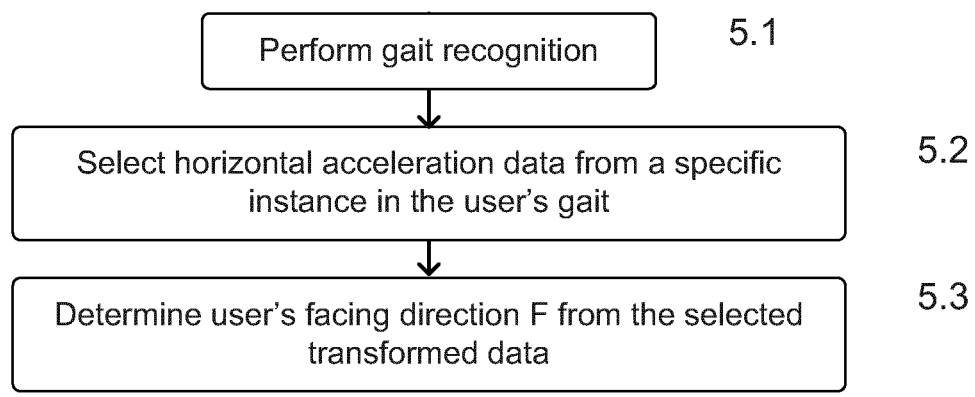
FIG. 5 illustrates a first method of determining the orientation of the body of the user of a portable electronic device.

With reference to FIG. 5, a process is shown which illustrates a method of the first category of methods, which uses a short period in the accelerations measured by a portable electronic device 1 during a user's 2 gait cycle to determine a user's facing direction F while walking. The short period may correspond to an instance of time. The method of FIG. 5 may, for example, be selected at step 4.9 of FIG. 4 when the portable electronic device 1 is known to be located at a position relative to the user's 2 body at which the device will experience deterministic motion during the user's gait cycle. Such deterministic motion may for example occur when the portable device is being carried in a user's upper-body pocket, trouser pocket or on a user's belt.

The portable electronic device 1 samples the measurements of its three-axis accelerometer 12 and this sampled information is therefore available to the device. To determine the facing direction F, the portable electronic device 1 requires acceleration data obtained while the user is walking forwards. The controller 9 of the portable electronic device may then digitally filter the accelerometer measurements in order to remove high frequency noise. For example, the 5 Hz mean filter previously described may be used to filter the accelerometer measurements.

At step 5.1, the device 1 begins examining the acceleration readings and detects that the user 2 is walking by recognising certain acceleration behaviour corresponding to human walking locomotion. The acceleration behaviour experienced by a device, located on a user, corresponding to walking locomotion will differ depending on the location of the device. The device may therefore select a gait identification algorithm according to the determined location of the device and then begin identifying each individual gait on the data stream.

The device may examine the vertical acceleration data transformed from the accelerometer data measured in the device reference frame by implementing the mathematical transformation representation. In this case the device may detect that the user is walking by recognising vertical accelerations corresponding to human walking locomotion. For example, if the device is determined as being carried in the user's trouser pocket, the device may look for, and recognise, acceleration behaviour in the vertical acceleration data corresponding to one of the user's heels striking the ground (termed a heel strike) and/or one of the users feet pushing off of the ground (termed a toe-off) before being swung forwards towards a next heel strike. As a further example, if the device is determined as being located in a chest pocket of the user or on their belt, the device may look for, and recognise, acceleration behaviour in the vertical acceleration data corresponding to the heel strikes and toe-off's of both of the user's feet. Moreover, the process of identifying gait dependant vertical acceleration behaviour at the device may comprise a hierarchy of peak detection algorithms examining the vertical acceleration data, for example to find each user heel-strike and corresponding toe-off. To avoid confusion between peaks successfully detected by such an algorithm, and random noise in accelerometer samples, an average filtering of the data may be performed before the peak detection process.

At step 5.2, based on information stored on the device 1 determined by prior analysis of the motion of devices carried at a plurality of locations relative to a walking user's body 2, the controller 9 then selects at least one instance or short time period during the identified user gaits on the data stream, based on the known location of the device relative to the user's body, at which the device will be accelerating in the user facing direction F and at which the acceleration in the facing direction is large in comparison to the acceleration normal to the sagittal plane S of the user 2. The controller then extracts the horizontal acceleration measured during the one or more short periods in the user's gait during each identified gait on the data stream. The facing direction F of the user 2 is then determined as corresponding to the acceleration direction of the extracted acceleration information in the earth reference frame at step 5.3.

FIG. 5 provides a method for a portable electronic device 1, which is located relative to a user 2 such that it experiences predominantly deterministic movement during walking, to quickly and accurately determine the facing direction F of a user while also being computationally efficient. Furthermore, this method does not necessitate interaction with, or reliance on, systems or infrastructure external to the device.

Figure 6:
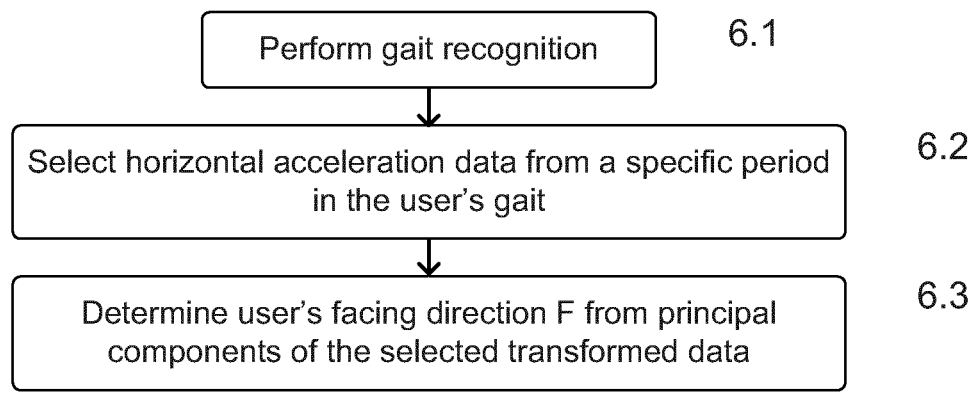
FIG. 6 illustrates a second method of determining the orientation of the body of a user of a portable electronic device.

With reference to FIG. 6, a process is shown which illustrates a method of the second category of methods, which uses a longer period, compared to the first category of methods, of the acceleration measured by a portable electronic device 1 during a user's 2 gait cycle to determine a user's facing direction F while walking.

The method of FIG. 6 may, for example, be selected at step 4.9 of FIG. 4 when the portable electronic device 1 is known to be located at a position relative to the user's body 2 at which the portable electronic device will experience semi-deterministic motion during the user's gait cycle. Such semi-deterministic motion may for example occur when the portable device is being carried in a user's backpack or shoulder bag.

The portable electronic device 1 samples the measurements of its accelerometers 12 and this sampled information is therefore available to the device. To determine the facing direction F, the portable electronic device 1 requires acceleration data obtained while the user is walking. The controller 9 of the portable electronic device may then digitally filter the accelerometer measurements, using for example the 5 Hz filters 14, in order to remove high frequency noise.

At step 6.1, the device 1 begins examining the acceleration readings and detects that the user 2 is walking by recognising certain acceleration behaviour corresponding to human walking locomotion. The device then begins identifying each individual gait on the data stream. As in the method described with respect to FIG. 5, the device 1 may examine the vertical acceleration data resolved from the acceleration data measured in the device reference frame by implementing a mathematical transformation representation.

At step 6.2, based on information stored on the device determined by prior analysis of the motion of devices carried at a plurality of locations relative to a walking user's body 2, the controller 9 then selects one or more periods during the identified user gaits on the data stream, based on the known location of the device relative to the user's body, at which the acceleration of the device normal to the sagittal plane S of the user is small compared to the acceleration of the device in the facing direction of the user. Whereas the method described with respect to FIG. 5 involves an analysis of the acceleration during a short period or instance at which the acceleration of the device normal to the sagittal plane is close to zero, such a short period may not exist for the device locations for which the second category methods are used. However, it is still possible to find a period during which the acceleration normal to the sagittal plane is small compared to the acceleration of the device in the facing direction of the user. However, the one or more periods selected in the second category methods may be longer than the one or more periods selected according to the first category methods described with respect to FIG. 5. The controller selects the horizontal acceleration measured during the one or more periods of the user's gait during each identified gait on the data stream.

Since the selected data still contains a significant amount of acceleration normal to the sagittal plane S it is not possible to immediately determine the facing direction F of the user 2 from the data. At step 6.3, the portable electronic device 1 therefore performs Principal Component Analysis on the selected data and determines that the facing direction F of the user 2 is parallel to the axis of the first principal component. As Principal component Analysis has been previously briefly described with reference to FIG. 3 and is also known in the art, it will not be described in detail herein. The device then determines the absolute facing direction by further analysing the sensory data, for instance the facing direction may be determined by double integrating the acceleration data over both axial directions and taking the one which provides a positive result.

FIG. 6 provides a method for a portable electronic device 1, which is located relative to a user 2 such that it experiences predominantly semi-deterministic movement during walking, to quickly, accurately and efficiently determine the facing direction F of a user. Moreover, the method of FIG. 6 does not necessitate interaction with, or reliance on, systems or infrastructure external to the device.

For some locations, the methods of the first and the second category, which described with respect to FIGS. 5 and 6, are not appropriate and an aforementioned alternative method will be used instead. This alternative method for determining the facing direction F of the user comprises transforming accelerometer 12 readings in the device reference frame into an earth reference frame, performing Principal Component Analysis on the horizontal acceleration readings and using the principal components to determine the facing direction of the user 2. In more detail, the statistical analysis is not carried out on only specific time periods of a user's gait cycle but is carried out over a time period corresponding to one or more entire gait cycles. This alternative method of determining the facing direction is known in the art and will not be described in detail herein. The method may, for example, be selected when the portable electronic device 1 is known to be located at a position relative to the user's body at which the device will experience non-deterministic motion during the user's gait cycle.

Such non-deterministic motion may for example occur when the portable device is being carried in a user's hand or handbag.

It should be understood that the determining of the timing of the user's gait cycle performed at steps 5.1 and 6.1 of the methods of FIGS. 5 and 6 respectively could be performed using information from any sensors capable of detecting and measuring a measurable effect experienced by the device which changes cyclically in dependence on the gait cycle of the user during walking. If sensors other than the accelerometer of the device are used to determine the timing of the user's gait, the timing of the user's gaits determined from the other sensors can then be used to identify the relevant portions of the accelerometer data for determining the facing direction. Moreover, if the accelerometer readings are not used to determine the timing of the user's gait, the raw acceleration data may need to be transformed into the earth reference frame in order to determine the facing direction F.

The method of FIG. 4 allows for the determining of the orientation of a user 2 relative to an earth reference frame, by determining the user facing direction F, in a computationally efficient and reliable manner, for a plurality of device 1 locations relative to a user's body 2, irrespective of the orientation of the device.

As such, the method of FIG. 4 could provide a large opportunity for significant further development of portable electronics technologies. Knowledge of orientation of a user 2 relative to an earth reference frame would offer immediate benefits to many existing portable electronic device applications, for example informing a user 2 of their facing direction F relative to a map of their surroundings or notifying two users, each with their own devices 1, of when they are facing each other. The method of FIG. 4 could further, for example, be used to create new smart environments where the electrical infrastructure of an area requires an awareness of the facing direction F of human users 2 within that area and utilises this information to enhance the user's experience of that area.

It will be appreciated that although it has been described with respect to FIG. 4 that the device 1 can first determine the location of the device using sensor data in a first process and then determine the orientation of the user using the location of the device relative to the user 2 in a second process, the two process do not have to be carried out together and the invention is not limited to a combination of the two processes. Information indicating the location can be used for other purposes than determining the orientation of a user relative to an earth reference frame. Correspondingly, the location information used to determine the orientation of the user can be obtained in any suitable way and does not have to be obtained from accelerometer data as described with respect to FIG. 3.

The methods of FIGS. 4, 5 and 6 allow for the determination of the orientation of a user's body relative to an earth reference frame (X, Y, Z) by determining the user's facing direction F. However, as mentioned above, methods based on the methods of FIGS. 4, 5 and 6 could also be used to determine the orientation of a user's body relative to the device reference frame by using the mathematical representation to transform the determined orientation of a user's body relative to the earth reference frame into the device reference frame. Furthermore, by estimating the relative orientation of the user with respect to the device in this way, and by analysing this information over time, the device could, for example, detect changes in the orientation of the device relative to the user and further respond to such a detected change by performing the required calibration process again, recalibrating the device to its new orientation.

The processes described with respect to FIG. 3 to 6 may be stored as a set of instructions in one or more computer programs and the processes may be carried out when the computer programs are executed by one or more processors.

Whilst specific examples of the invention have been described, the scope of the invention is defined by the appended claims and not limited to the examples. The invention could therefore be implemented in other ways, as would be appreciated by those skilled in the art.

For example, as mentioned above, the portable electronic device for implementing the invention does not have to be a mobile communication device but can be any suitable device for implementing the invention. For example, a portable electronic device for implementing the invention may not include the wireless communication interface 7 or codec 8 described with respect to FIG. 2. Moreover, the portable electronic device may not include a magnetometer. Furthermore, the portable electronic device does not require the positioning functionality described with respect to FIG. 2. Additionally, it will be appreciated that the portable communication device could function with other forms of user interface than the depicted combination of display 5, keypad 6, speaker 3 and microphone 4 components shown in FIG. 2. It will also be appreciated that the portable communication device can be provided without any form of user interface, and could be of any physical shape and size suitable for being carried by a person.

The invention claimed is:

1. A method of determining a location relative to the body of a user of a device carried by the user, comprising:
   determining a mathematical representation of a transformation between a device reference frame and an earth reference frame at the device;
   receiving movement data from a sensor arrangement of the device capable of measuring movement of the device while the user is walking;
   transforming the movement data, using said mathematical representation, into earth reference frame components;
   identifying a substantially principal component of variation of at least one component of the transformed data;
   resolving the transformed data into the substantially principal component;
   determining, by performing statistical analysis on the resolved data, one or more statistical characteristics of the resolved data; and
   identifying a location of the device relative to the user by comparing the determined one or more statistical characteristics to one or more predetermined statistical characteristics.

2. A method according to claim 1, wherein the sensor arrangement comprises an accelerometer arrangement and said movement data comprises acceleration information for the device.

3. A method according to claim 2, wherein the at least one component of the transformed data comprises a horizontal component or a vertical component of.

4. A method according to claim 1, wherein the sensor arrangement comprises a magnetometer arrangement.

5. A method according to claim 1, wherein the earth reference frame comprises a reference axis corresponding to the vertical direction and a plane corresponding to the horizontal plane, and the method further comprises,
   prior to determining said mathematical representation, receiving sensory information from the sensor arrangement while the user is standing, analysing the sensory information to determine that the user is standing, and, in response to a determination that the user is standing, determining the direction of the reference axis of the earth reference frame relative to the device reference frame from the received and analysed sensory information, and wherein determining a mathematical representation comprises determining a mathematical representation of the transformation between a set of three orthogonal axis of the device reference frame and the reference axis and reference plane.

6. A method according to claim 1, wherein identifying a location of the device relative to the user by comparing the determined one or more statistical characteristics to one or more predetermined statistical characteristics comprises using a statistical classifier algorithm.

7. A method performed by a device carried by a user, the method comprising:
 determining a location of the device relative to the body of a user using the device; and
 selecting a method out of a plurality of methods for determining the orientation of the user relative to a reference frame, using the device, based on the determined location of the device
 using a sensor arrangement of the device to detect and measure a measurable effect experienced by the device representing a pattern of movement of the user which changes in dependence on the location of the device;
 performing the selected method for determining the orientation of the user relative to the reference frame using the device by processing information representing the measurable effect detected and measured by the sensor arrangement in a manner dependent on the location of the device.

8. A method according to claim 7, wherein, the sensor arrangement is capable of detecting and measuring a measurable effect experienced by the device which changes cyclically in dependence on the gait cycle of the user during walking, and the sensor arrangement comprising at least one accelerometer arrangement capable of measuring acceleration in three-dimensions.

9. A method according to claim 8, wherein the reference frame comprises a first reference frame and wherein a number of methods of said plurality of methods comprise
 selecting one or more periods within a user's gait cycle according to the determined location of the device using the device, the one or more periods within the user's gait cycle being one or more periods during which the device movement is predominantly in a predetermined direction relative to a second reference frame corresponding to the reference frame of the user;
 measuring the acceleration of the device during the one or more periods using the device; and
 estimating the user's orientation relative to the first reference frame from the measured acceleration using the device.

10. A method according to claim 9, wherein the predetermined direction relative to the second reference frame is the direction in which the user's body is facing.

11. A method according to claim 9, wherein, in at least one of said number of methods, estimating the user's orientation relative to the first reference frame comprises determining that the direction of acceleration during the one or more periods is the predetermined direction relative to the second reference frame using the device.

12. A method according to claim 9, wherein, in at least one of said number of methods, estimating the user's orientation relative to the first reference frame comprises performing statistical analysis on acceleration data measured during the one or more periods using the device.

13. A method according to claim 12, wherein performing statistical analysis comprises performing principal component analysis on acceleration data measured during the one or more periods and determining that the direction of one of the principal components corresponds to the predetermined direction relative to the second reference frame using the device.

14. A method according to claim 8, wherein one of the plurality of methods comprises measuring the acceleration of the device and carrying out principal component analysis on the measured acceleration using the device.

15. A method according to claim 8, wherein the reference frame is an earth reference frame; and
 wherein the method further comprises determining a mathematical representation of a transformation between a device reference frame and the earth reference frame using the device, and wherein the plurality of methods comprise using measured acceleration information which has been transformed into the earth reference frame using the mathematical representation.

16. A method according to claim 15, wherein the sensor arrangement comprises a magnetometer arrangement and wherein prior to determining the mathematical representation, the method comprises:
 receiving information from the accelerometer arrangement and the magnetometer arrangement in the device;
 analysing the received information from the accelerometer arrangement using the device to determine that the user is standing and, in response to a determination that the user is standing, determining a first axis of the earth reference frame relative to the device reference frame, corresponding to the vertical direction, from the received information using the device;
 determining a second axis of the earth reference frame relative to the device reference frame, corresponding to the direction of north, based on received information from the magnetometer arrangement and the determined vertical direction relative to the device using the device; and
 determining a third axis of the earth reference frame relative to the device as being orthogonal to the first and second axis;
 wherein determining a mathematical representation using the device comprises determining a mathematical representation of the transformation between a set of three orthogonal axis of the device reference frame and the determined first, second and third axis of the earth reference frame.

17. A method according to claim 16, further comprising receiving information from the sensor arrangement in the device while the user is walking, using this information in the device to detect changes in the orientation of the device relative to the earth reference frame and recalculating the mathematical representation to account for the new orientation of the device relative to the earth reference frame using the device.

18. A method according to claim 15, further comprising determining the orientation of a user's body relative to the device reference frame using the device by using the mathematical representation to transform the determined orientation of the user relative to the earth reference frame into the device reference frame.

19. A device for determining a location of the device relative to a user of the device when the device is carried by the user, comprising:
- a controller;
- a memory for storing information corresponding to a mathematical representation of a transformation between a device reference frame and an earth reference frame at the device and one or more statistical characteristics related to different locations of the device; and
- a sensor arrangement capable of measuring movement of the device;
- wherein the controller is configured to:
    - receive movement data from said sensor arrangement obtained while the user carrying the device is walking;
    - transform said movement data, using said mathematical representation, into earth reference frame components;
    - identify a substantially principal component of variation of at least one component of the transformed data;
    - resolve the transformed data into the substantially principal component;
    - determine, by performing statistical analysis on the resolved data, one or more statistical characteristics of the resolved data; and
    - identify a location of the device relative to the user by comparing the determined one or more statistical characteristics to the one or more stored statistical characteristics.

20. A device according to claim 19, wherein the sensor arrangement comprises an accelerometer arrangement and the movement data comprises acceleration information from said accelerometer arrangement.

21. A device according to claim 20, wherein the at least one component of the transformed data comprises at least one out of a horizontal component or a vertical component.

22. A device according to claim 19, wherein the sensor arrangement comprises a magnetometer arrangement.

23. A device according to claim 19, wherein the earth reference frame comprises a reference axis corresponding to the vertical direction and a plane corresponding to the horizontal plane, wherein the controller is further configured to receive sensor information from said sensor arrangement obtained while the user carrying the device is standing, analyse the received sensory information to determine if the user is standing and, in response to a determination that the user is standing, determine the direction of the reference axis of the earth reference frame relative to the device reference frame from said sensory information obtained while the user is standing, and
- wherein the controller is further configured to determine the mathematical representation by determining a mathematical representation of the transformation between a set of three orthogonal axis of the device reference frame and the reference axis and the reference plane of the earth reference frame.

24. A device according to claim 19, wherein identifying a location of the device relative to the user by comparing the determined one or more statistical characteristics to the one or more stored statistical characteristics comprises using a statistical classifier algorithm.

25. A device for determining the orientation of a user, carrying the device, relative to a reference frame, comprising:
- a memory for storing information about a plurality of methods for determining the orientation of the user relative to a specific frame;
- a sensor arrangement operable to detect and measure a measurable effect experienced by the device representing a pattern of movement of the user which changes in dependence on the location of the device; and
- a controller configured to receive information about the location of the device relative to the user and select a method out of the plurality of methods, based on the information about the location of the device;
- in which the controller is configured to perform the selected method for determining the orientation of the user relative to the specific frame by processing information representing the measurable effect detected and measured by the sensor arrangement in a manner dependent on the location of the device.

26. A device according to claim 25, wherein the controller is configured to determine, as part of a number of the plurality of methods, timings of the user's gait cycle using information from said sensor arrangement.

27. A device according to claim 26, wherein the sensor arrangement comprises an accelerometer arrangement for measuring acceleration of the device in three-dimensions,
- wherein the reference frame comprises a first reference frame, and
- wherein the controller is configured to, as part of said number of the plurality of methods:
- select one or more periods within a user's gait cycle based on the information about the location of the device, the one or more periods being one or more periods during which the device movement is predominantly in a predetermined direction of a second reference frame corresponding to the reference frame of the user,
- select acceleration data obtained by the acceleration arrangement during the one or more periods, and
- estimate the user's orientation relative to the first reference frame from the acceleration data.

28. A device according to claim 27, wherein the predetermined direction relative to the second reference frame is the direction in which the user's body is facing.

29. A device according to claim 27, wherein the controller is configured for at least one of said number of methods, to estimate the user's orientation relative to the first reference frame by determining that the direction of acceleration, during the one or more periods, corresponds to the predetermined direction of the second reference frame.

30. A device according to claim 27, wherein the controller is configured for at least one of said number of methods, to estimate the user's orientation relative to the first reference frame by performing principal component analysis on acceleration data measured during the one or more periods and determining that the direction of one of the principal components corresponds to the predetermined direction relative to the second reference frame.

31. A device according to claim 25, wherein the memory is further configured to store a mathematical representation of a transformation between a third reference frame, corresponding to a device reference frame, and the first reference frame and wherein the controller is configured to transform measured acceleration information into said first reference frame using said stored mathematical representation.

32. A device according to claim 31, wherein the first reference frame is an earth reference frame and the sensor arrangement further comprises a magnetometer arrangement and wherein the controller is further configured to:

determine a first axis of the earth reference frame relative to a device reference frame from information received from the accelerometer arrangement while the user is standing, the first axis corresponding to the vertical direction;

determine a second axis of the earth reference frame relative to the device reference frame, corresponding to the direction of north, based on received information from the magnetometer arrangement and the determined vertical direction relative to the device;

determine a third axis of the earth reference frame relative to the device reference frame as being orthogonal to the first and second axis; and determine said mathematical representation, as a mathematical representation of a transformation between a set of three orthogonal axis of the device reference frame and the determined first, second and third axis of the earth reference frame.

33. A device according to claim 32, wherein the controller is further configured to use information received from the sensor arrangement while the user is walking to detect changes in the orientation of the device relative to the earth reference frame and to recalculate the mathematical representation to account for the new orientation of the device relative to the earth reference frame.

34. A device according to claim 31, wherein the controller is further configured to determine the orientation of the user's body relative to a device reference frame by using the mathematical representation to transform the determined orientation of the user relative to the first reference frame into the device reference frame.

\* \* \* \* \*